United States Patent Office 3,385,882
Patented May 28, 1968

3,385,882
FLUOROALKYL GLUTARATES
Victor Tullio, Wilmington, Del., assignor to E. I. du Pont de Nemours and Company, Wilmington, Del., a corporation of Delaware
No Drawing. Continuation-in-part of application Ser. No. 277,031, Apr. 30, 1963. This application Oct. 16, 1964, Ser. No. 404,527
6 Claims. (Cl. 260—485)

ABSTRACT OF THE DISCLOSURE

Process for preparing esters of α-methyleneglutaric acid which comprises dimerizing $CH_2=CH-COOR$ where R is fluoroalkyl in the presence of a tertiary phosphine. Novel dimers of $CH_2=CH-COOR$ which are useful as oil and water repellents and as lubricants.

---

This application is a continuation-in-part of my copending application Ser. No. 277,031, filed Apr. 30, 1963, now abandoned, which is a continuation-in-part of my application Ser. No. 256,227, filed Feb. 5, 1963, now abandoned.

This invention is directed to novel fluoroalkyl glutarates.

One of the conventional methods for the dimerization of acrylic compounds involves treating the monomer with an alkali metal or its enolate, penolate or amide. However, these conventional methods give low yields and are not desirable. For instance, reaction of ethyl acrylate at 80° C. in the presence of sodium methoxide gave only a 10% yield of the dimer, diethyl α-methyleneglutarate. (J. Chem. Soc. 1925, 2779.)

It is an object of this invention to form novel fluoroalkyl glutarates by treating fluoroalkyl acrylates in the presence of tertiary phosphines.

These and other objects will become apparent from the following description and claims.

More specifically, the present invention is directed to a process for the preparation of esters of α-methyleneglutaric acid, which process comprises dimerizing at about 0° C. to 200° C. compounds of the formula $$CH_2=CH-COOR$$

in the presence of a tertiary phosphine of the formula $R_1R_2PR_3$, wherein R is a fluorine substituted alkyl radical selected from the group consisting of (A) $H(CF_2CF_2)_nCH_2-$ where $n$ is an integer from 1 to 4, (B) $F(CF_2CF_2)_{n'}CH_2CH_2-$ where $n'$ is an integer from 1 to 5, (C) $XCF_2CF_2-O-(-CFXCF_2O-)_{n''}CFXCH_2-$ where X is fluorine or trifluoromethyl and $n''$ is a cardinal number from 0 to 5, and (D) $F(CF_2)_{n'''}CH_2-$ wherein $n'''$ is an integer from 2 to 9, and wherein $R_1$ and $R_2$ of the phosphine are alkyl radicals of 1 to 10 carbon atoms and may be alike or different, and $R_3$ of the phosphine is an alkyl radical of 1 to 10 carbons, phenyl or $C_{1-10}$ alkyl-substituted phenyl radical, and recovering from the reaction mixture the corresponding esters of α-methyleneglutaric acid.

The present invention is also directed to novel compounds having the structures

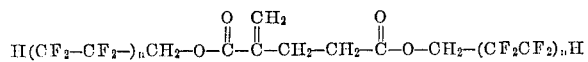

wherein $n$ is an integer from 1 to 4, and

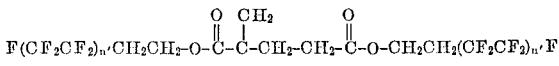

wherein $n'$ is an integer from 1 to 5, and

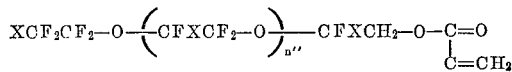

where X is F or $CF_3$ and $n''$ is a cardinal number from 0 to 5, and

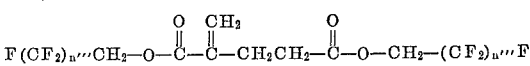

where $n'''$ is an integer from 2 to 9.

It is well known that polymerization of acyclic compounds such as acrylontrile takes place very rapidly and vigorously when the phosphine catalyst is introduced into the acrylonitrile. Characteristic of this reaction is the great evolution of heat and the formation of a black polymeric material.

It is, therefore, unexpected and surprising to find that good yields of simple dimers may be obtained by contacting and reacting fluoroalkyl acrylates in the presence of tertiary phosphines by the process conditions of this invention, since it was known heretofore that polymerization occurred rapidly when the phosphine was introduced into the acrylic compounds. It is also surprising that under the process conditions of this invention dimerization is favored and formation of higher polymers is minimized.

The particular method of bringing the acrylate and phosphine together is not critical, although it is preferred to add the acrylate to a solution of the phosphine, since slightly higher yields are obtained thereby.

In the dimerization of the fluoroalkyl acrylate, it is preferred to conduct the addition and the reaction in the absence of air, preferably under an atmosphere of an inert gas, such as nitrogen. Oxygen tends to deteriorate the phosphine catalyst, forming phosphine oxides and therefore should not be present during addition and reaction.

Dimerization is conveniently effected at temperatures ranging from about 0° C. to 200° C., preferably 20° C. to 150° C., over a period of from 30 minutes to 4 hours.

Although not necessary, it is preferred to add a polymerization inhibitor, such as phenothiazine, to the reaction mixture to insure against polymerization of the dimer product.

At the end of the dimerization, the reaction mass, if at an elevated temperature, is cooled to room temperature and the phosphine catalyst is preferably neutralized with an acid or acid precursors, such as dilute HCl, dimethyl sulfate or acetic acid. The dimer is recovered from the reaction mass by distillation, preferably vacuum distillation.

Monomers suitable for dimerization according to this process are compounds of the formula $$CH_2=CH-COOR$$

wherein R is a fluoroalkyl radical selected from the group consisting of (A) $H(CF_2CF_2)_nCF_2-$ where $n$ is 1 to 4, (B) $F(CF_2CF_2)_{n'}CH_2CH_2-$ wherein $n'$ is 1 to 5, (C) $XCF_2CF_2-O-(-CFXCF_2-O-)_{n''}CFXCH_2-$ where X is F or $CF_3$, and $n''$ is 0 to 5, and (D) $F(CF_2)_{n'''}CH_2-$ where $n'''$ is 2 to 9. Representative examples of compounds within this definition which are dimerized according to the process of this invention are as follows:

1,1,3-trihydrotetrafluoropropyl acrylate,
1,1,5-trihydrooctafluoropentyl acrylate,
1,1,7-trihydrododecafluoroheptyl acrylate,
1,1,9-trihydrohexadecafluorononyl acrylate,
1,1,2,2-tetrahydropentafluorobutyl acrylate,
1,1,2,2-tetrahydrononafluorohexyl acrylate,
1,1,2,2-tetrahydrotridecafluorooctyl acrylate,
1,1,2,2-tetrahydroheptadecafluorodecyl acrylate,
1,1,2,2-tetrahydroheneicosafluorododecyl acrylate,
1,1-dihydroperfluoropropyl acrylate,
1,1-dihydroperfluorobutyl acrylate,
1,1-dihydroperfluorohexyl acrylate,
1,1-dihydroperfluorooctyl acrylate,

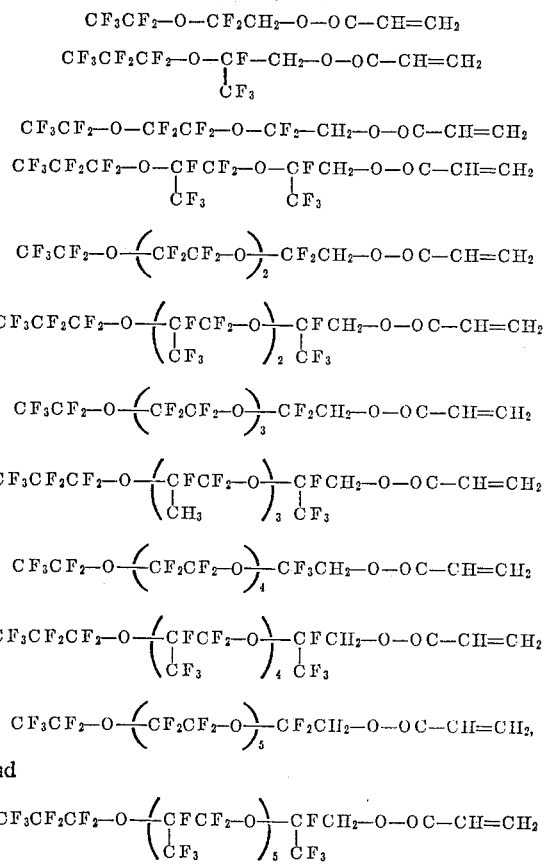

The acrylate ester starting materials of the present invention may be easily prepared from the corresponding fluoroalcohol by usual esterification or transesterification methods well known in the art. For instance, the ester may be prepared by contacting and reacting the alcohol with acrylic acid, acrylyl chloride or an alkyl acrylate, e.g., methyl acrylate. Such methods are better illustrated by the following reaction equations:

(A) $H(CF_2CF_2)_nCH_2OH + CH_2=CHCOCl \rightarrow$
  $H(CF_2CF_2)_nCH_2O-CO-CH=CH_2 + HCl$ (B) $F(CF_2CF_2)_3CH_2CH_2OH + CH_2=CHCOCl \rightarrow$
  $F(CF_2CF_2)_3CH_2CH_2O-CO-CH=CH_2 + HCl$
and (C)
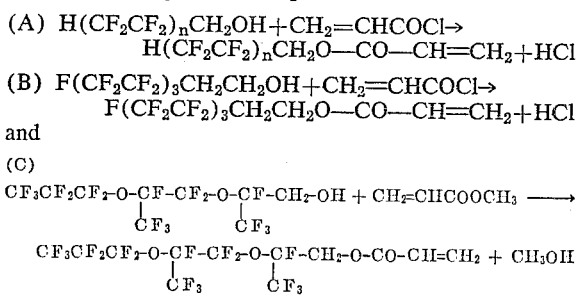

The alcohols used to form the acrylate esters of type (A) above are well known and a method for their preparation is described in U.S.P. 2,559,628. The preparation of acrylates from these alcohols is also described in U.S.P. 2,628,958. The alcohols $F(CF_2CF_2)_nCH_2CH_2OH$ used to form the acrylate esters of type (B) above are also well known and a method for their preparation is described in Pierce et al., JACS, 75, 5618 (1953) and by Park et al., J. Org. Chem. 23, 1166 (1958). The alcohols $XCF_2CF_2O(CFXCF_2O)_{n''}CFXCH_2OH$, where X is F or $CF_3$ and $n''$ is an integer from 0 to 5, which are used to form the acrylate esters of type (C) above, are prepared by reacting the acid fluoride $$XCF_2CF_2O(CFXCF_2O)_nCFXCOF$$

with an alkali metal borohydride in an inert solvent. The acid fluorides are in turn prepared by polymerization of tetrafluoroethylene oxide,

or hexafluoropropylene oxide,

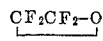

either in the presence of activated carbon or ionic salts, such as alkali fluorides, quaternary ammonium fluorides or quaternary ammonium salts, such as quaternary ammonium cyanide, which are readily converted to the quaternary ammonium fluorides. The acid fluorides may also be prepared by the reaction of trifluoroacetylfluoride with tetrafluoroethylene oxide or pentafluoropropionyl fluoride with hexafluoropropylene oxide in the presence of quaternary ammonium fluorides as above described.

As a more specific illustration of the preparation of the alcohols $XCF_2CF_2O(CFXCF_2O)_{n''}CFXCH_2OH$, the following procedure was followed in preparing the alcohol $CF_3CF_2CF_2OCF(CF_3)CF_2OCF(CF_3)CH_2-OH$.

Hexafluoropropylene oxide was bubbled into a stirred solution of cesium fluoride in acetonitrile at 40° C. to 45° C. The crude product was separated and periodically withdrawn into a distillation apparatus wherein the product $CF_3CF_2CF_2OCF_2(CF_3)COF$ (B.P. 50° C.) was fractionally distilled from the reaction mass and returned to the reaction vessel. The residue in the distillation apparatus consisted of:

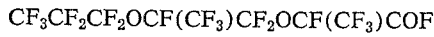

(B.P. 108–110° C.) (82% yield) and

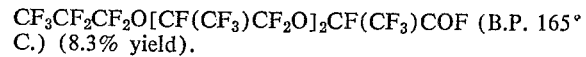
(8.3% yield).

The distilled acid fluoride
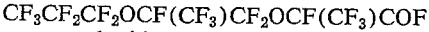
is then contacted with an alkali metal borohydride in an inert solvent to obtain a good yield of the corresponding alcohol $CF_3CF_2CF_2OCF(CF_3)CF_2OCF(CF_3)CH_2OH$.

The acrylate esters of type (D) having the structure $CH_2=CH-COOCH_2(CF_2)_{n'''}F$, wherein $n'''$ is an integer from 2 to 9, are prepared according to the process described in U.S.P. 2,642,416. Actually, U.S.P. 2,642,416 specifically described a process for the acrylates where $n'''$ is from 3 to 9 only. However, in J. Polymer Sci., 15, 515 (1955) the process of U.S.P. 2,642,416 is described as being also applicable to the preparation of the acrylates where $n'''$ is 2.

The phosphine catalyst applicable in the dimerization of the above compounds is a tertiary phosphine of the formula $R_1R_2PR_3$, wherein $R_1$ and $R_2$ are alkyl radicals of 1 to 10 carbon atoms and may be alike or different and $R_3$ is alkyl of 1 to 10 carbon atoms, phenyl or phenyl radical having an alkyl substituent of 1 to 10 carbon atoms. Representative examples of suitable tertiary phosphines which are applicable in the novel process of this invention are as follows: trimethyl phosphine, triethyl phosphine, tri-n-butyl phosphine, trihexyl phosphine, diethyldecyl phosphine, diethylphenyl phosphine, diethyl p-ethylphenyl phosphine, and diethyl p-decylphenyl phosphine.

A complex of the phosphine which dissociates slowly to yield the free phosphine may be used in place of the hereinbefore mentioned phosphine compound in the process of this invention. Representative examples of such complexes would be the tertiary phosphines described above complexed with a halide, e.g., chloride, bromide or iodide, of mercury, cadmium, gold, palladium, silver, nickel, cobalt, copper, platinum, zinc, or tin.

The amount of phosphine utilized is generally 0.02 to 0.05 part by weight of the monomer. The catalyst is preferably dissolved in an aromatic hydrocarbon solvent, such as benzene or p-xylene, at room temperature. The quantity of solvent is such that a liquid medium is provided for the reaction. Generally a ratio of 20 to 250 parts of solvent to one part of catalyst is effective. However, the quantity of the solvent is not critical and more concentrated solutions, such as 5 parts of solvent to one part of catalyst, as well as more dilute solutions, may be used. In the case of more dilute solutions, however, quantities of solvent in excess of 1000 parts of solvent to one part of catalyst are wasteful, requiring large apparatus and therefore are not preferred.

Representative examples illustrating the process are as follows. All parts are by weight unless otherwise specified.

EXAMPLE 1

Two and four tenths part of tri-n-butyl phosphine were added dropwise from a dropping funnel to 47 parts of $CH_2=CH-COOCH_2CF_2CF_2H$ at room temperature under nitrogen. An exothermic reaction occurred and the temperature rose to 70° C. before external cooling was applied. When the vigorous reaction ceased, the solution was heated at 100° C. for 30 minutes. Distillation of the products yielded 20 parts of the dimer

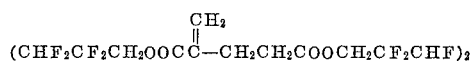

which distilled at 85° C. to 87° C. at 0.25 mm. Hg.

When $CH_2=CH-COOCH_2CF_2CF_3$ is substituted for $CH_2=CH-COOCH_2CF_2CF_2H$ in the above procedure, good yields of the dimer

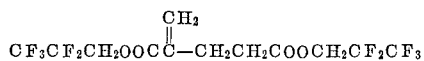

are obtained.

EXAMPLE 2

Fifty-four parts of $CH_2=CHCOOCH_2CF_2CF_2H$ were added dropwise from a dropping funnel under a nitrogen atmosphere to a refluxing solution (80° C.) of 2 parts of tri-n-butyl phosphine in 50 parts of benzene under continuous stirring. When the addition was complete, the solution was heated under reflux (80° C.) for one hour. The solution was cooled to room temperature and 100 parts of 1 N HCl was added. The layers were separated and the organic layer was washed twice with water, dried over MgSO_4 and was distilled. The dimer

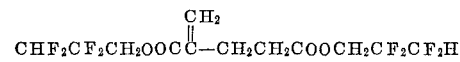

obtained amounted to 35 parts.

When triethyl phosphine is substituted in the above Example 2, substantially the same results are obtained.

When the details of Example 2 are followed using $CH_2=CHCOOCH_2(CF_2CF_2)_3H$ in place of $$CH_2=CHCOOCH_2CF_2CF_2H$$

and diethylphenyl phosphine in place of tributyl phosphine,

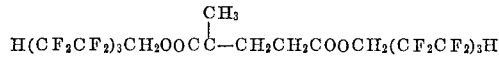

is obtained.

When $CH_2=CHCOOCH_2CF_2CF_2CF_2CF_3$ is substituted in the procedure of this example for $$CH_2=CHCOOCH_2CF_2CF_2H$$

is obtained in good yields.

EXAMPLE 3

Into a 100 ml. flask equipped with a thermometer, stirrer, condenser and drying tube, and nitrogen inlet, there was placed 50 gm. (0.1195 mole) of 1,1,2,2-tetrahydrotridecafluorooctyl acrylate under a nitrogen atmosphere. When one ml. (0.8 gm., 0.004 mole) of tributyl phosphine was pipetted into the flask, an exothermic reaction occurred and the temperature rose from 12° C. to 25° C. before external cooling was applied. The reaction was stirred overnight at room temperature.

An additional 1 ml. (0.8 gm., 0.004 mole) of tributyl phosphine was added after about 16 hours and the temperature raised to 100° C. and maintained until monomer could not be detected by gas chromatography.

The crude dimer was topped by distilling to 100° C. at 0.5 mm. Hg and then transferred to an Asco "50-2" Rota-film molecular still. Thirty-two grams of product which distilled at 90° C. to 92° C. and 0.002 mm. Hg were collected. Gas chromatographic analysis indicated that this product was about 78% acrylate dimer of the structure

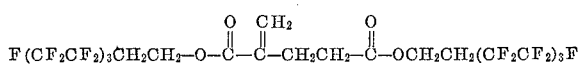

Infrared and nuclear magnetic resonance spectra confirmed the dimer structure.

A sample of the dimer was redistilled for elemental analysis. The fraction boiling at 118° C. to 132° C. at 0.005 mm. Hg was collected.

*Analysis.*—Calcd. for $C_{22}H_{14}F_{26}O_4$(M.W. 836): C, 31.6; H, 1.67; F, 59.1. Found: C, 31.9; H, 1.8; F, 57.1.

Molecular weight determinations of the sample in 1,1,2-trichlorotrifluoroethane were 844 and 832.

When the acrylates 1,1,2,2-tetrahydropentafluorobutyl acrylate or 1,1,2,2-tetrahydroeicosafluorododecyl acrylate are substituted for the 1,1,2,2-tetrahydrotridecafluorooctyl acrylate in the above Example 3, good yield of the corresponding dimers are obtained.

When the catalysts diethyldecyl phosphine, diethyl p-ethylphenyl phosphine or tri-n-butyl phosphine complexed with nickel chloride are substituted for the tributyl phosphine catalyst in the above example, substantially the same results are obtained.

EXAMPLE 4

Into a 100 ml. flask equipped with a thermometer, stirrer, nitrogen inlet, and condenser fitted with a drying tube, there was placed under a nitrogen atmosphere 100 gm. (0.188 mole) of 2,3,3,3-tetrafluoro-2-[hexafluoro-2-(heptafluoropropoxy)-propoxy]propyl acrylate, having the structure

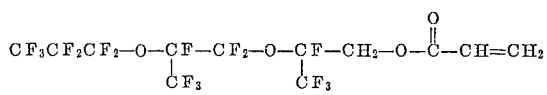

When 2 ml. (1.6 gm., 0.008 mole) tributyl phosphine was pipetted into the flask, an exothermic reaction occurred and the temperature rose from 24° C. to 48° C. After stirring one hour at room temperature, the reaction temperature was raised to 100° C. for five hours and then overnight at room temperature. After 24 hours an additional one ml. (0.8 gm., 0.004 mole) tributyl phosphine was added and the reaction stirred for 2 hours at 100° C. The extent of reaction was measured by disappearance of fluoroalcohol acrylate monomer as determined by gas chromatography. At the end of the reaction period, tributyl phosphine catalyst was destroyed by reacting with 4 ml. dimethyl sulfate (5.4 gm., 0.043 mole). The reaction mixture was distilled twice from a flask equipped with a Claisen head and condenser. The second fraction from the second distillation, B.P. 101° C. to 112° C. at 0.005 mm. Hg., was submitted for analysis.

Analysis for the dimer structure

*Analysis.*—Calcd. for $C_{24}H_{10}F_{34}O_8$ (M.W. 1072): C, 26.9; H, 1.07; F, 60.3. Found: C, 28.3; H, 1.1; F, 58.7.

Molecular weight of the sample determined in 1,1,2-trichlorotrifluoroethane was 989.

The analysis thus confirmed that the dimer was formed in good yields.

When the fluoroalkyl acrylates of the structure $CF_3CF_2OCF_2CH_2O-OC-CH=CH_2$ and

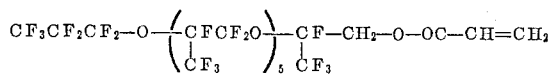

are substituted for the fluoroalkyl acrylate used in the above Example 4, good yields of the corresponding dimer were obtained.

It has been shown by the foregoing examples that the fluoroalkyl acrylates hereinbefore defined can be satisfactorily dimerized in the presence of the selected tertiary phosphines of this invention.

The unsaturated dimers of the invention are useful as monomers in the preparation of copolymers with other unsaturated compounds such as butadiene, acrylonitrile, styrene, and vinyl chloride to produce polymers having improved aging properties, compatibility and adhesion.

The novel compounds of this invention are useful as oil and water repellents. These novel fluoroalkyl esters may also be hydrogenated to form saturated esters which have improved lubricating properties. The saturated esters also form extremely stable lubricants, which are especially useful at high temperatures.

It is understood that the preceding examples are representative and that said examples may be varied within the scope of the total specification, as understood by one skilled in the art, to produce essentially the same result.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A member selected from the group consisting of compounds having the structure

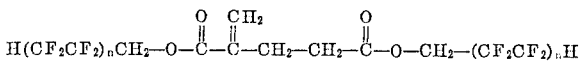

wherein $n$ is an integer from one to four, compounds having the structure

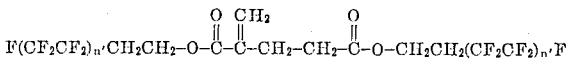

wherein $n'$ is an integer from 1 to 5, compounds having the structure

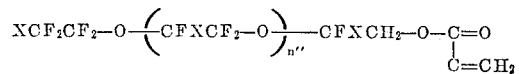

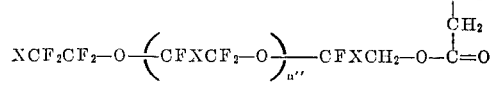

wherein X is selected from the group consisting of fluorine and trifluoromethyl, and $n''$ is a cardinal number from 0 to 5, and compounds having the structure

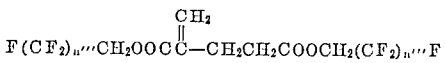

wherein $n'''$ is an integer from 2 to 9.

2. Compounds having the structure

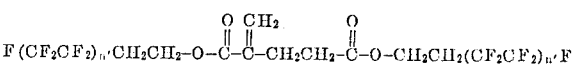

wherein $n'$ is an integer from 1 to 5.

3. Compounds having the structure

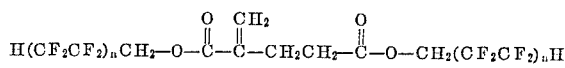

wherein $n$ is an integer from 1 to 4.

4. Compounds having the structure

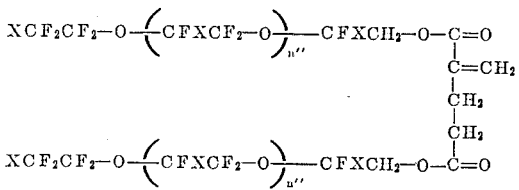

wherein X is selected from the group consisting of fluorine and trifluoromethyl, and $n''$ is a cardinal number from 0 to 5.

5. Compounds having the structure

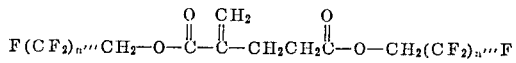

wherein $n'''$ is an integer from 2 to 9.

6. The compound having the structure

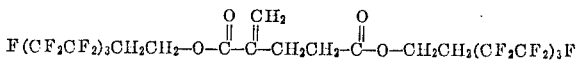

References Cited

UNITED STATES PATENTS

| 2,244,487 | 6/1941 | Crawford. |
| 2,244,645 | 6/1941 | Jacobson. |
| 2,522,366 | 9/1950 | Gresham. |
| 2,840,617 | 6/1958 | Shokal. |
| 2,921,957 | 1/1960 | O'Rear et al. |
| 2,924,589 | 2/1960 | Jurgeleit. |
| 3,074,999 | 1/1963 | Rauhut et al. |

FOREIGN PATENTS

| 855,554 | 11/1952 | Germany. |
| 927,384 | 5/1955 | Germany. |

OTHER REFERENCES

Horner et al.: Ann., 591, 108 (1955).
Danusso et al.: La Chemica e L' Industria, 38, 293 (1956).

LORRAINE A. WEINBERGER, *Primary Examiner.*

T. L. GALLOWAY, *Assistant Examiner.*